T., J. & E. L. VICARS.
BISCUIT CUTTING MACHINE.
APPLICATION FILED OCT. 12, 1914.

1,231,817.

Patented July 3, 1917.
2 SHEETS—SHEET 2.

UNITED STATES PATENT OFFICE.

THOMAS VICARS, JOHN VICARS, AND EDWARD LYNTON VICARS, OF EARLESTOWN, ENGLAND.

BISCUIT-CUTTING MACHINE.

1,231,817.　　　　Specification of Letters Patent.　　Patented July 3, 1917.

Application filed October 12, 1914. Serial No. 866,236.

*To all whom it may concern:*

Be it known that we, THOMAS VICARS, JOHN VICARS, and EDWARD LYNTON VICARS, subjects of the King of Great Britain, residing at Earlestown, in the county of Lancaster, England, have invented new and useful Improvements in Biscuit-Cutting Machines, of which the following is a specification.

This invention relates to biscuit cutting machines, either those known as "embossing" machines, or the ordinary cutting machines, and the object is to provide means for enabling the lift of the ejecting plates for the ordinary cutters to be readily adjusted even without stopping the machine.

Figure 1:
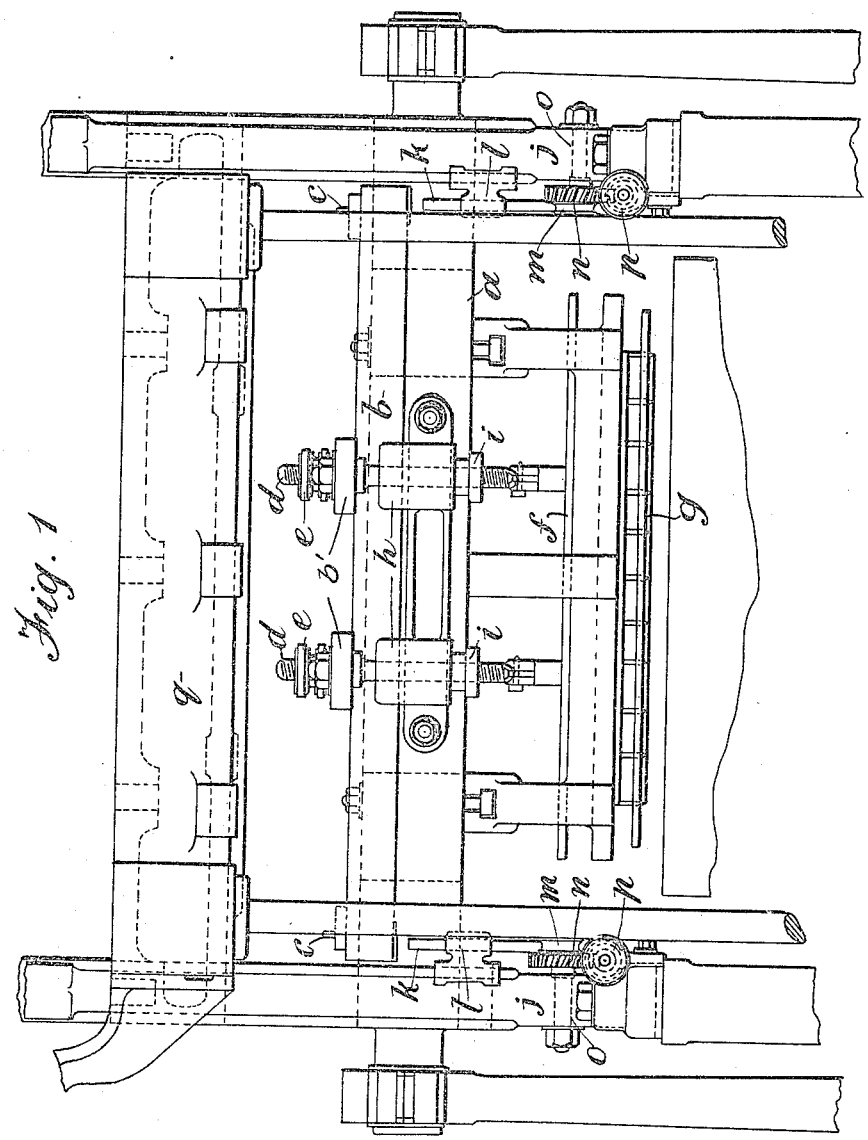
Figure 2:
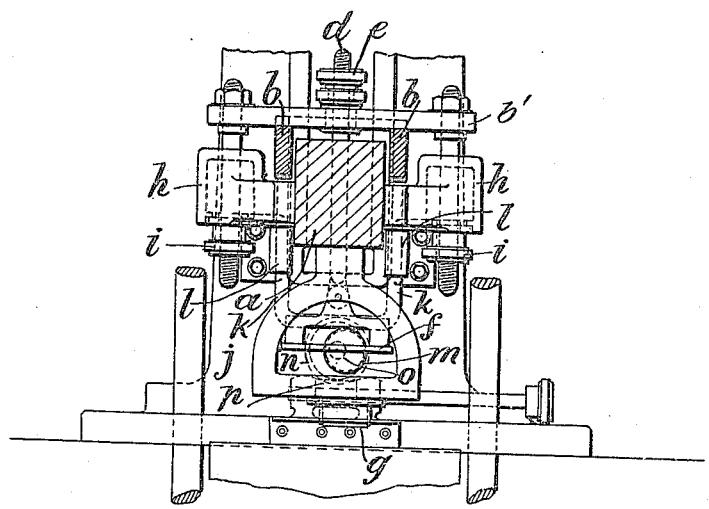
Figure 3:
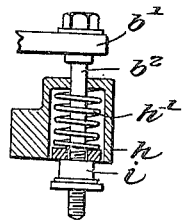

The invention is hereafter described with reference to the accompanying drawings whereon Figure 1 is an end view, Fig. 2 a sectional view at right angles to Fig. 1 and Fig. 3 a sectional detail view of one of the ejector spring boxes, all part of a biscuit cutting machine showing our improvements, in carrying out which we arrange loosely on the cutting head $a$ a bar, or bars, or plate $b$ kept in position by pins $c$ on the crosshead $a$ and carrying by cross bars $b'$ screws and nuts $d$ and $e$ for adjusting the position of the ejector plate $f$ and ejectors in the ordinary cutters $g$ which cutters are attached to the cutting crosshead $a$ in the usual way. The springs $h'$ acting through rods $b^2$ attached to the bars $b'$ for forcing down the ejectors may be carried in boxes $h$ attached to the cutting crosshead $a$ on each side and are regulated by nuts $i$. To the framework $j$ of the machine at each side are attached stop pieces $k$ against which the ends of the bars or plate $b$ strike when the cutter head $a$ descends to the cutting point thus stopping the descent of the plate $b$ and ejectors so that the ejectors are kept out of contact with the biscuits until the cutter head rises again.

These stop pieces are movable up and down in guides $l$ on the framework by eccentrics $m$ operated by worm wheels $n$ on pins $o$ and worms $p$, or by screws, levers, &c., independently of the motion of the cutter head so that the lift of the ejectors may be varied without stopping the machine. The plate or bars $b$ are so arranged on the cutting head $a$ that they do not touch the embossing crosshead $q$ at any time even when the embossing crosshead is running idle so that when an embossing machine is to be used as an ordinary cutting machine the gear for moving the embossing head $q$ need not be disconnected, but only the embossing cutters and embossers removed in the usual way by unscrewing the connecting bolts and ordinary cutters and ejectors attached to the cutting head $a$, as shown.

We claim:

In a biscuit cutting machine having cutters, a crosshead to operate said cutters, ejectors, bars carrying said ejectors and adapted to be operated by the cutter crosshead, adjustable stops on the side framework to limit the descent of said bars, and means for adjusting said stops while the machine is in operation, comprising a cam operatively connected to each stop, a worm wheel upon which said cam is mounted, a worm engaging said worm wheel, and means whereby to operate said stop through said worm, worm wheel and cam.

In testimony whereof we have signed our names to this specification in the presence of two subscribing witnesses.

THOMAS VICARS.
　　JOHN VICARS.
　　EDWARD LYNTON VICARS.

Witnesses:
　W. B. JOHNSON,
　G. H. WILSON.

Copies of this patent may be obtained for five cents each, by addressing the "Commissioner of Patents, Washington, D. C."